(12) United States Patent
Vanderveen et al.

(10) Patent No.: US 6,354,567 B1
(45) Date of Patent: *Mar. 12, 2002

(54) THROTTLE SHAFT AND BUTTERFLY CONSTRUCTION

(75) Inventors: James Vanderveen, Blenheim; Zhouxuan Xia, Windsor, both of (CA)

(73) Assignee: Siemens Canada Limited, Tilbury (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/342,703

(22) Filed: Jun. 29, 1999

(51) Int. Cl.[7] ............................................. F16K 1/22
(52) U.S. Cl. ...................................................... 251/308
(58) Field of Search ................................. 251/308, 305; 123/337

(56) References Cited

U.S. PATENT DOCUMENTS

| | | | | |
|---|---|---|---|---|
| 2,986,373 A | * | 5/1961 | Masheder | 251/305 |
| 4,005,849 A | * | 2/1977 | Lorthiois | 251/305 |
| 4,243,203 A | * | 1/1981 | Mack | 251/305 |
| 5,029,811 A | * | 7/1991 | Yamamoto et al. | 251/306 |
| 5,098,064 A | | 3/1992 | Daly et al. | |
| 5,666,988 A | * | 9/1997 | Becker | 251/308 |

FOREIGN PATENT DOCUMENTS

| | | |
|---|---|---|
| EP | 0 899 073 A | 3/1999 |
| JP | 0 832 6565 A | 10/1996 |

OTHER PUBLICATIONS

European Search Report dated Apr. 18, 2001.

* cited by examiner

Primary Examiner—Kevin Shaver
Assistant Examiner—Eric Keasel

(57) ABSTRACT

A throttle shaft and butterfly construction is formed by molding both components from composite plastic, the shaft having integral bosses which are received in holes formed in the throttle plate. The bosses are ultrasonically or heat staked to lock the throttle plate onto the throttle shaft. The butterfly has ribs extending across a face of the butterfly substantially to the edge of the valve in a direction parallel to the flow of air across the butterfly to stiffen the butterfly and reinforcing ribs on the butterfly parallel to the throttle shaft to stiffen both the butterfly and the throttle shaft.

14 Claims, 4 Drawing Sheets

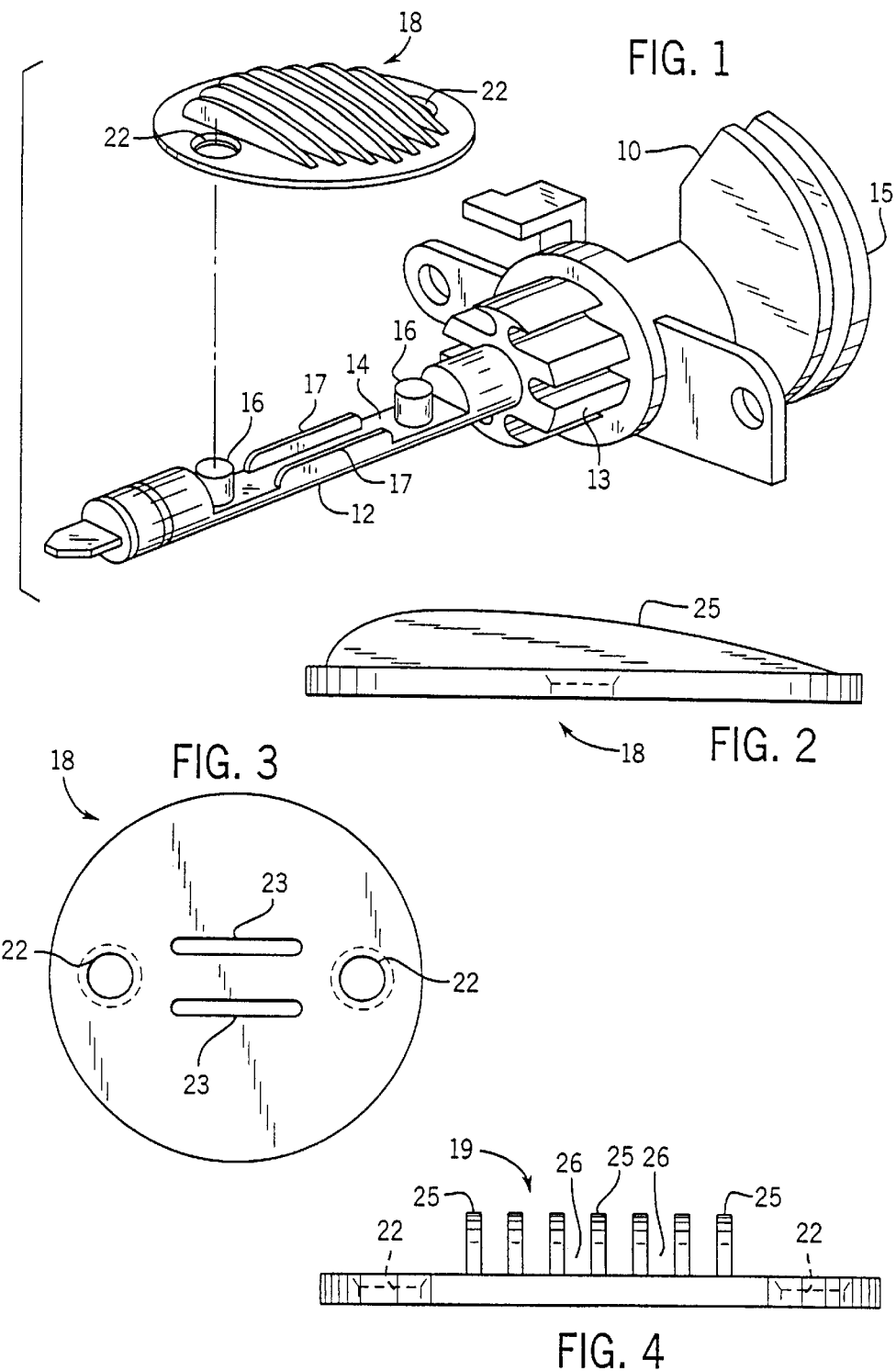

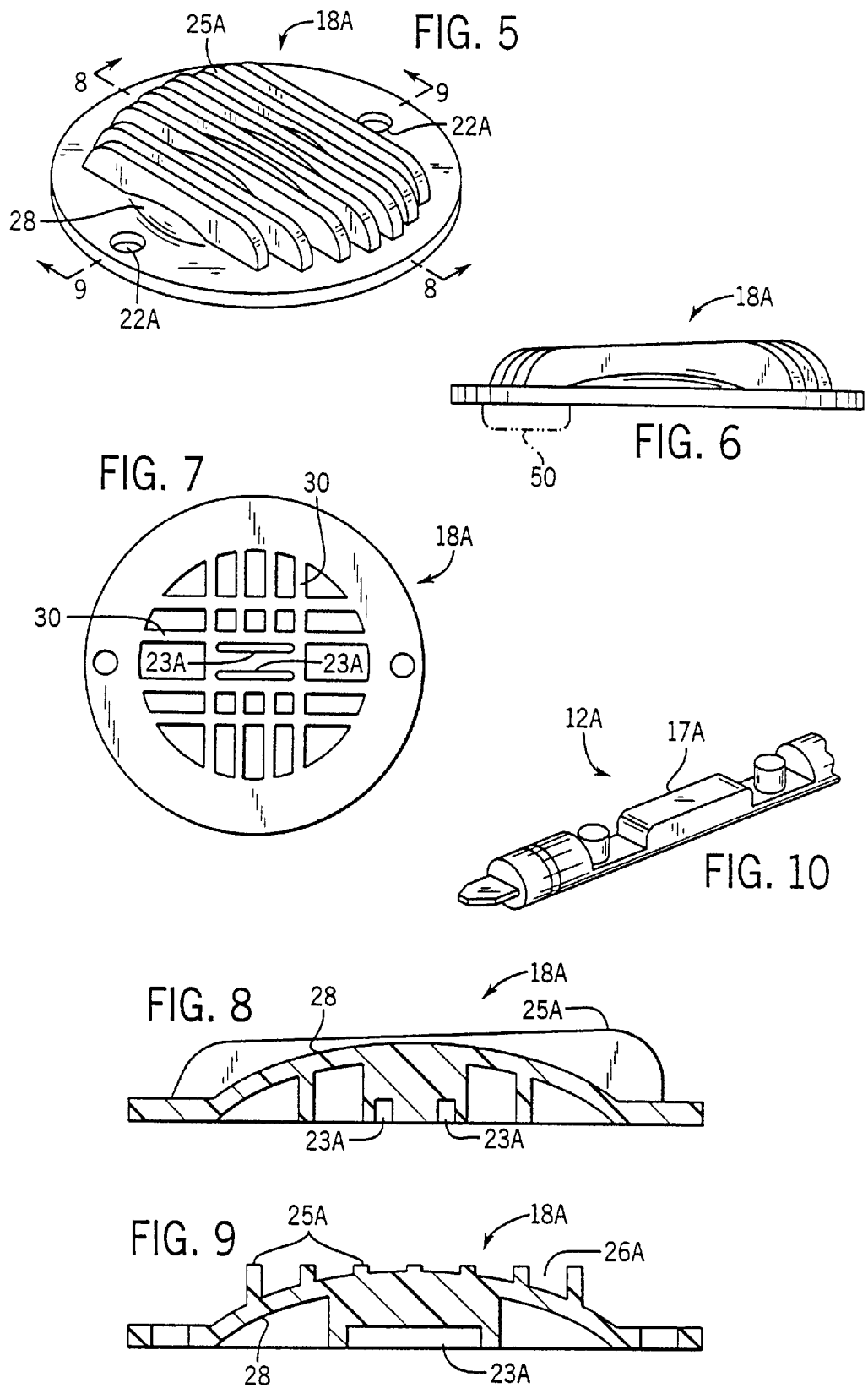

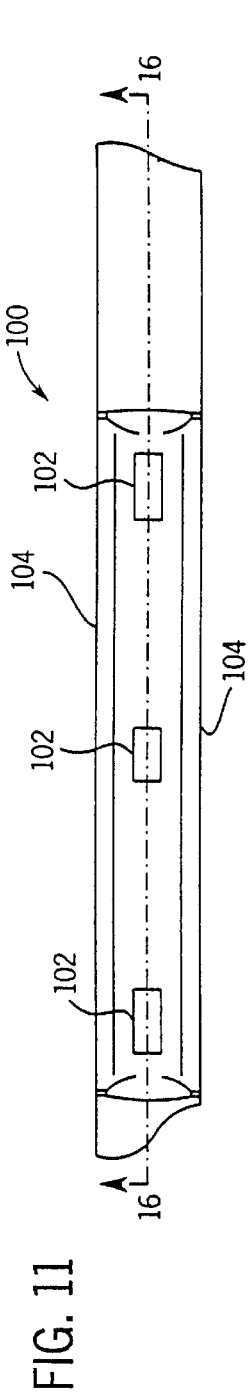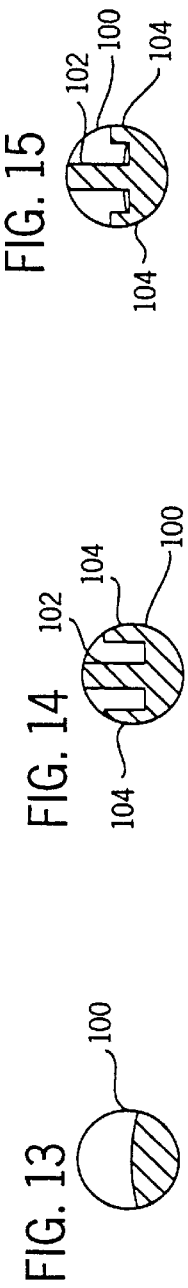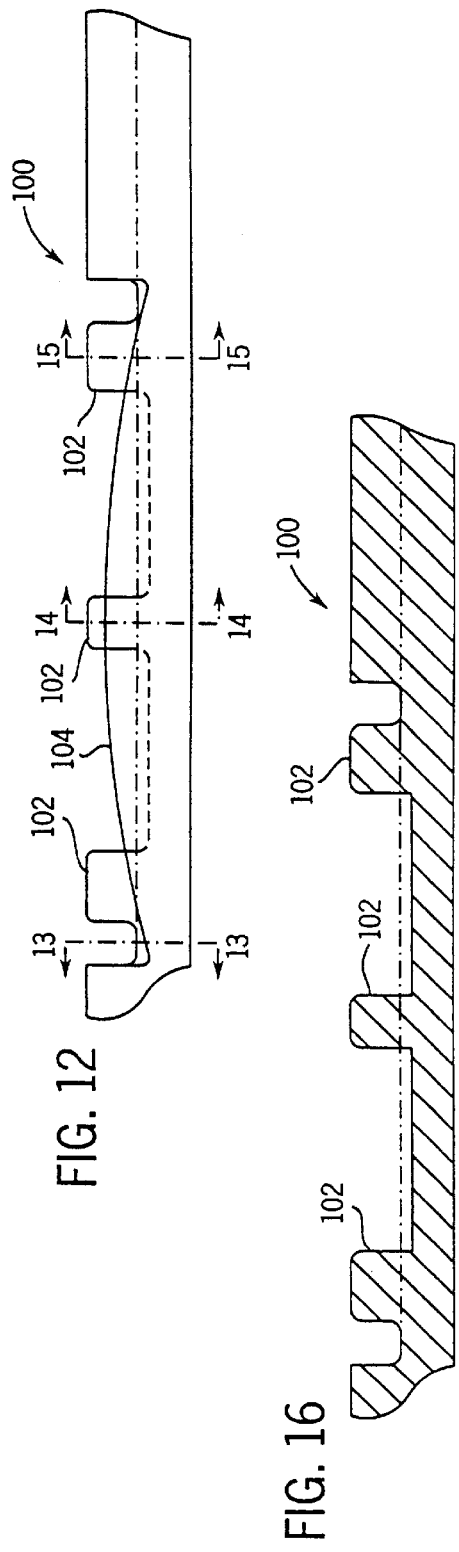

THROTTLE SHAFT AND BUTTERFLY CONSTRUCTION

FIELD OF THE INVENTION

The invention is directed generally to throttle valves used in air intake systems for internal combustion engines. More particularly, it relates to the interaction between, and construction of, the throttle plate (or butterfly) and throttle shaft, so that as a unit they resist bending to a greater extent than current butterfly and shaft combinations.

BACKGROUND OF THE INVENTION

This invention concerns a throttle valve construction for automotive engines. Throttle valves typically comprise a butterfly or throttle plate attached to a throttle shaft extending across the bore of a throttle body controlling inlet airflow to the intake manifold.

The throttle shaft is rotated to control the airflow by variably restricting the throttle bore with the throttle plate by rotating the throttle shaft.

While metal, in particular steel and aluminum, have been the preferred construction materials in the past, fiber filled or reinforced thermoplastics have been lately considered as replacements, for example high temperature Nylon 66 filled with glass fibers for reinforcement.

Thermoplastics are generally not as strong as metals and suffer from high temperature creep. Thermoplastic components also tend to deflect under the pressure differentials that are generated across the butterfly in modern internal combustion engines. To solve this problem, some have proposed making the shaft and butterfly thicker. This, however, blocks the free flow of air through the throttle body in which the valve is installed. In one design, for example, the butterfly has a hollow tube that slides over the shaft when the shaft is inserted. This design, however, provides a large barrier to airflow due to the combined thickness of the shaft and the butterfly tube. In addition, this design requires that the butterfly be positioned within the throttle body and alignied with shaft holes in the throttle body before the throttle shaft can be inserted. Since the butterfly is slid onto the throttle shaft, the tube in the throttle body must have an inside diameter at least as great as the major diameter of the shaft.

It is an object of this invention to provide a throttle shaft and butterfly that when combined resist bending stresses to a greater extent than current designs, based upon the interaction between the throttle shaft and butterfly resisting bending as a unit.

It is an object of the invention to provide a stronger throttle shaft and butterfly that do not block as much of the air flow through the throttle body. It is also an object of this invention to provide a throttle shaft and butterfly that can be assembled by first inserting the throttle shaft into the throttle body and subsequently attaching the butterfly to one side of the throttle shaft.

SUMMARY OF THE PRESENT INVENTION

The above object and others which will become apparent upon a reading of the following specification and claims are achieved by a throttle valve construction in which the throttle shaft component is molded from a plastic composite material, and is formed with a flattened side against which one side of the throttle plate is held. One or more bosses integrally formed projecting from the flattened side of the throttle shaft, are received into corresponding holes in the throttle plate which is also molded from a composite plastic.

One or more ribs are formed in the throttle shaft that extend parallel to the length of the shaft. These shaft ribs are preferably spaced apart and fitted into mating recesses in the butterfly plate.

Ribs may also be provided on an outer surface of the butterfly to strengthen it. These butterfly ribs preferably extend perpendicular to the axis of the shaft from one wing to the other wing of the butterfly.

Viewing the butterfly ribs from the side, they preferably describe an upper surface of an airfoil.

Other principal features and advantages of the invention will become apparent to those skilled in the art upon review of the following drawings, the detailed description and the appended claims.

BRIEF DESCRIPTION OF THE DRAWINGS

FIG. 1 is an exploded perspective view of a throttle shaft and its associated throttle plate;

FIG. 2 is a side view of the throttle plate of FIG. 1 showing the air foil shape of the ribs extending from the free side of the throttle plate;

FIG. 3 is a bottom view of the throttle plate showing the two recesses adapted to receive mating ribs extending from the throttle shaft and two holes adapted to receive bosses extending from the throttle shaft;

FIG. 4 is an end view of the throttle plate of FIG. 1 showing the ribs extending from a free surface thereof;

FIG. 5 illustrates an alternative embodiment of the throttle plate of FIGS. 1–4 having a convex shape on an outer surface thereof with ribs extending from a free side of the butterfly;

FIG. 6 shows a side view of the butterfly of FIG. 5 and illustrates additional ribs that extend from the side of the throttle plate facing the shaft;

FIG. 7 is a bottom view of the throttle plate of FIGS. 5 and 6 showing the side of the plate facing the shaft, two holes through which the throttle shaft bosses pass, and two recesses adapted to receive the ribs extending from the shaft;

FIGS. 8 and 9 are cross-sectional views taken at sections 8—8 and 9—9, respectively, in FIG. 5 showing the saucer-shaped construction of the center portion of the throttle plate of FIGS. 5–9;

FIG. 10 illustrates a portion of an alternative throttle shaft having a single rib extending from a center portion of the shaft disposed between two bosses;

FIG. 11 is a top view of another embodiment of a throttle shaft;

FIG. 12 is a side view of the throttle shaft of FIG. 11;

FIGS. 13–15 are sectional views of the throttle shaft of FIGS. 11 and 12 taken at sections 13—13, 14—14 and 15—15 in FIG. 12;

FIG. 16 is a sectional view of the throttle shaft of FIGS. 11–15 taken at section 16—16 in FIG. 11;

Figure 17:
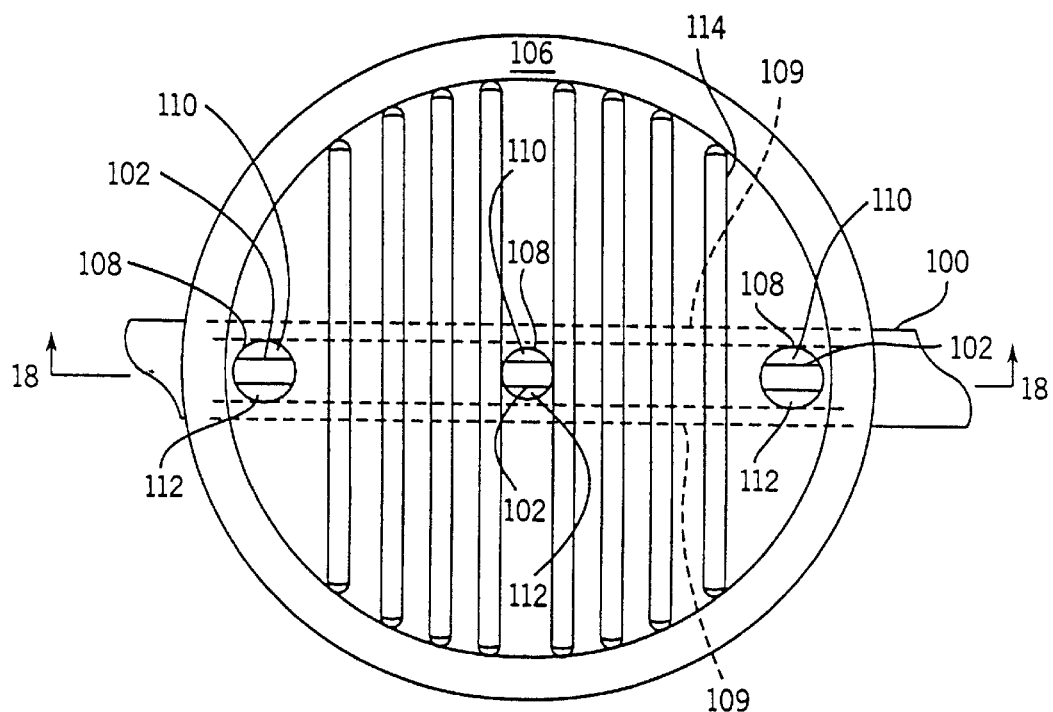
FIG. 17 is a top view of a butterfly assembled together with the throttle shaft of FIGS. 11–16.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to the drawings, a molded throttle shaft component 10 is shown, which includes the throttle shaft 12 itself. The shaft 12 is integrally formed with other features of the throttle shaft component 10, such as the spring retainer 13 and lever 15. The throttle shaft component may be formed by injection molding of the part from a composite plastic material.

The plastic material should be selected so as to allow an efficient ultrasonic staking operation as described herein. It preferably resists bending stresses at elevated temperatures (250° F.) through the addition of glass, carbon or mineral fibers. Preferred shaft materials include high temperature polyamide with carbon or long glass fiber reinforcement, carbon or glass fiber reinforced polyetherimide (PEI) or carbon glass filled polyphenylene sulfide (PSS). Preferred butterfly materials include glass and mineral filled polyetherimide or glass/mineral reinforced syndiotactic polystyrenes.

The throttle shaft 12 has a recess formed on one side to create a blade mounting flat 14, from which projects perpendicularly a pair of spaced apart cylindrical bosses 16, molded integrally with the shaft component 10. The bosses 16 should be of a height low enough as to lie within the diameter of the throttle shaft 12 thereby allowing assembly by insertion of the shaft 12 through an opening in the throttle body (not shown) in which the throttle shaft component 10 is installed prior to heat staking of the bosses 16.

Two shaft ribs 17 also extend away from the flat 14, substantially parallel to bosses 16. Ribs 17 extend parallel to the longitudinal axis of the shaft for a distance that is preferably less than the distance between bosses 16.

The butterfly or throttle plate 18 comprises a disc also molded of a composite plastic material and having a pair of spaced apart holes 22 formed therein. The holes 22 are spaced apart and sized to receive the bosses 16 when the plate 18 is placed on the surface 14.

The holes 22 may be chamfered on the side of the throttle plate 16 away from the throttle shaft 12, as shown in FIGS. 2–4, to improve the strength of the connection produced when the bosses 16 are ultrasonically staked.

A clearance space between each of the bosses 16 and a respective one of the holes 22 allows alignment of the butterfly 18 as necessary within the throttle body air induction bore prior to the staking operation.

Two recesses 23 are provided on the side of the butterfly 18 fixed to the shaft that receive shaft ribs 17. These recesses, like the shaft ribs 17 they receive, extend parallel to the longitudinal axis of shaft 12.

A plurality of ribs 25 are formed on the side of the butterfly plate that faces away from the shaft. These ribs extend perpendicular to the longitudinal axis of the shaft, and thus parallel to the direction of airflow through the throttle body. One end of the ribs is fixed to one wing of the butterfly, and the other end is fixed to the other wing of the butterfly. Slots 26 are defined by adjacent ribs that also extend from one wing of the butterfly to the other wing of the butterfly.

As best seen in FIG. 2, the outer edge of ribs 25 define a curvilinear air foil shape in side view that extends from one wing of the butterfly to the other.

In an alternative embodiment, shown in FIGS. 5–9, the disc portion of the butterfly 18A may be shaped in the form of a saucer 28, where the side of the disc facing the shaft is concave, and the side of the disc facing away from the shaft is convex as seen in FIGS. 7–9. This form provides the disc with greater strength, thus permitting a thinner disc or a disc with fewer or smaller ribs. This saucer-shaped disc may have ribs 30 in the saucer-shaped portion of the disc to further strengthen the disc. These ribs 30 preferably extend from the inside bottom 32 of the saucer portion to the surface of the saucer-shaped portion. A substantially planar flange 34 may be provided that extends around the periphery of the saucer-shaped portion of the disk.

As in the example of FIGS. 1–4, the butterfly of FIGS. 5–9 has slots 23A to receive shaft ribs 17 of throttle shaft 12.

As in the first embodiment, the embodiment of FIGS. 5–9 has similar ribs 25A extending from the surface of the butterfly disposed away from the shaft that extends from one wing of the butterfly to the other, and defining slots 26A that extend from one wing of the butterfly to the other. Holes 22A are similarly provided and dimensioned for mounting butterfly 18A to shaft 12.

Ribs 50 may also be provided on the surface of the butterfly disposed toward shaft 12, preferably downstream from the shaft. "Downstream" refers to the direction of airflow through the throat of the throttle valve, and hence past the throttle shaft and butterfly.

An alternative throttle shaft 12A is shown in FIG. 10 that is similar in every respect to shaft 12 with one change: shaft 12A has a single rib 17A disposed between bosses 16. This single rib provides additional rigidity to shaft 12A and is configured to be disposed in a single slot on a butterfly. For example, either of the butterflies shown in FIGS. 1–9 could be employed with shaft 12A with appropriate modifications to slots 23 to accommodate the single rib 17A.

FIGS. 11–16 show another embodiment of a throttle shaft. Shaft 100 differs from the previous throttle shafts in that it has three generally rectangular bosses 102 disposed along its length. It also differs in the formation of ribs 104. Ribs 104 vary in height from a minimum height at each end to a maximum height generally in the middle of their longitudinal length. Ribs 104, unlike the ribs of the preceding examples, extend alongside the bosses.

Figure 18:
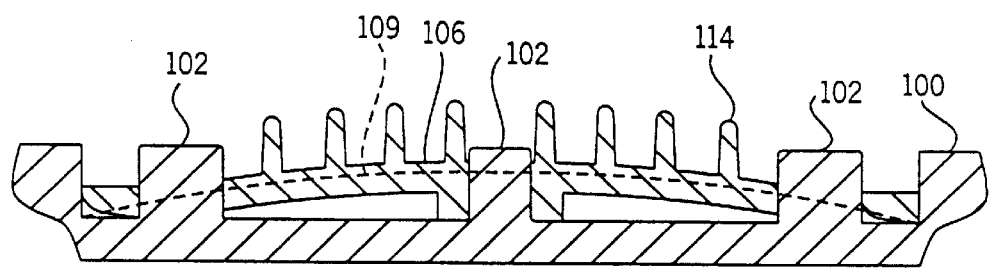
FIG. 18 is a side sectional view of the shaft-butterfly assembly taken at section 18—18 in FIG. 17.

FIG. 17 is a top view of throttle shaft 100 of FIGS. 11–16 assembled together with a butterfly 106. Butterfly 106 differs from the butterflies of the previous figures in that it has three holes 108 to receive its associated bosses 102, rather than the two hole arrangement shown in the previous examples, and in that it has two slots 109 with curved bottoms (i.e. a varying slot depth) to engage the curved ribs 104 of the throttle shaft of FIGS. 11–16. Since bosses 102 are rectangular in cross-section and holes 108 are round, spaces 10 and 112 are provided between the bosses and the holes in which they are inserted. This gap permits molten boss material (provided when the bosses are melted during the shaft, butterfly assembly process) to fill the gaps and more accurately position the throttle shaft with respect to the butterfly. By providing an additional boss and hole pair in the middle of butterfly 106, the connection between butterfly 106 and shaft 102 is strengthened. Ribs 114 of butterfly 106 may have the same profile as the ribs in the preceding examples, in particular having a greater height at their upstream ends than at their downstream ends. The slots or recesses 109 in the butterfly (shown as a dashed line in FIGS. 17 and 18) that receive the ribs of throttle shaft 100 are tapered; they are shallow on the ends and deep in the middle to match the shape of ribs 104 that are received in slots 109, which are similarly short on the ends and high in the middle. This arrangement accommodates the saucer-shaped center portion of butterfly 106 by providing the maximum rib engagement with the butterfly yet not permitting the rib to pass entirely through to the upper surface of butterfly 106.

In each of the embodiments above, to assemble the throttle shaft and butterfly assembly, the throttle shaft is first inserted into a throttle body, and the butterfly is then placed on the throttle shaft such that the bosses pass through the corresponding holes of the butterfly.

When proper alignment has been achieved, the bosses are heat staked ultrasonically causing portions thereof to melt and reflow to completely fill the chamfered sides of holes, including the clearance gap and the chamfer space. Upon cooling, the staked head of bosses securely locks the throttle plate onto the throttle shaft.

Conventional ultrasonic staking techniques and equipment can be employed in the process and details of this technique and equipment are not set forth herein inasmuch as these are well known in the art.

Preferably, an ultrasonic horn engages the head of each boss, and mechanical vibrations set up in the horn are transmitted into the head causing localized melting and reformation as described above.

The chamfering of holes allows smooth orientation of the fibers in extending outwardly to the larger diameter head formed by the staking if the entire boss is completely remelted, such that this technique is a preferred way of conducting the staking operation. A less smooth orientation results if only the top of the boss is remelted during staking. A smooth fiber orientation as well as the increased area of the chamfer provides greater strength in the head of the bosses.

Thus, it should be apparent that there has been provided in accordance with the present invention a throttle shaft and butterfly construction that fully satisfies the objectives and advantages set forth above. Although the invention has been described in conjunction with specific embodiments thereof, it is evidence that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A throttle shaft and butterfly valve construction comprising:
    a throttle shaft component of a plastic material having a throttle shaft portion formed with a flat surface, a pair of spaced apart bosses projecting from the surface and lying within an outer circumferential surface of the throttle shaft portion, the throttle shaft having a first shaft rib extending upward from the flat surface and running parallel to the longitudinal axis of the shaft;
    a butterfly plate, comprising a disc of a plastic material having first and second sides and formed with a pair of spaced apart holes adapted to overlie the pair of bosses, wherein the first side abuts the flat surface with the bosses projecting through the holes, the holes chamfered from the other side of the butterfly plate;
    wherein the bosses are heat staked over the butterfly plate and flowing plastic composite material from the bosses into the chamfered surfaces to secure the throttle plate to the throttle shaft;
    the first side having a first recess with a longitudinal extent substantially parallel to the longitudinal axis of the shaft and containing the first shaft rib.

2. The construction of claim 1, wherein the throttle shaft component further includes a second shaft rib substantially parallel to the longitudinal axis of the shaft and spaced apart from the first shaft rib and wherein the butterfly plate has a second recess with a longitudinal extent substantially parallel to the longitudinal axis of the shaft and containing the second shaft rib.

3. The construction of claim 2, wherein the longitudinal extent of the ribs is less than the distance between the two bosses.

4. The construction of claim 2, wherein the first and second shaft ribs extend outward from the shaft in the same direction as the pair of bosses.

5. The construction of claim 1, wherein the butterfly plate further includes a plurality of spaced-apart airflow ribs extending away from said second surface of the butterfly plate.

6. The construction of claim 5, wherein the plurality of ribs lies in a plane perpendicular to the longitudinal axis of the shaft.

7. The construction of claim 6, wherein the disc is saucer-shaped, and wherein one of the first and second sides is convex, and the other of the first and second sides is concave.

8. The construction of claim 7, wherein the first side is concave.

9. The construction of claim 8, further comprising first plate ribs extending toward the shaft from the concave portion and defining the first and second recesses between said plate ribs.

10. The construction of claim 5, wherein the plurality of ribs extends from a first wing of the butterfly plate to a second wing of the butterfly valve.

11. The construction of claim 10, wherein the outermost extent of the plurality of ribs defines a curvilinear upper airfoil surface.

12. A throttle shaft and butterfly valve construction comprising:
    a throttle shaft component of a plastic composite material having a throttle shaft portion;
    a butterfly plate, comprising a disc of a plastic material having first and second sides, wherein the first side has a saucer-shaped depression in a central portion thereof, said saucer shaped depression having a plurality of ribs extending from a bottom portion thereof and defining a rib-receiving recess; and
    wherein the butterfly plate is secured to the throttle shaft by a pair of bosses extending
    from the throttle shaft and staked to the butterfly plate, the throttle shaft having a
    rib disposed within said rib receiving recess.

13. A throttle shaft and butterfly valve construction comprising:
    a throttle shaft component of a plastic composite material having a throttle shaft portion;
    a butterfly plate, comprising a disc of a plastic material having first and second sides, wherein the first side has a saucer-shaped depression in a central portion thereof, said saucer shaped depression having a plurality of ribs extending from a bottom portion thereof and defining a rib-receiving recess therein, the second side having a plurality of ribs substantially perpendicular to the axis of rotation of the throttle shaft; and
    wherein the butterfly plate is secured to the throttle shaft by a pair of bosses extending from the throttle shaft and staked to the butterfly plate, the throttle shaft having a rib disposed within said rib receiving recess.

14. A throttle shaft and butterfly valve construction comprising:
- a throttle shaft component of a plastic composite material having a throttle shaft portion;
- a butterfly plate comprising a disc of a plastic material having first and second sides, wherein the first side has a saucer-shaped depression in a central portion thereof and a planar rim extending outward from the saucer-shaped depression, the saucer shaped depression having a plurality of ribs extending from a bottom portion thereof and defining a rib-receiving recess therein, and the second side having a plurality of ribs substantially perpendicular to the axis of rotation of the throttle shaft; and
- wherein the butterfly plate is secured to the throttle shaft by a pair of bosses extending from the throttle shaft and staked to the butterfly plate, the throttle shaft having a rib disposed within said rib receiving recess.

* * * * *